United States Patent
Ohbayashi et al.

[11] Patent Number: 5,362,538
[45] Date of Patent: Nov. 8, 1994

[54] OPTICAL RECORDING MEDIUM

[75] Inventors: Gentaro Ohbayashi; Kazuo Kakuo; Kusato Hirota; Naoya Seo, all of Otsu, Japan

[73] Assignee: Toray Industries, Inc., Tokyo, Japan

[21] Appl. No.: 43,923

[22] Filed: Apr. 8, 1993

[30] Foreign Application Priority Data

Oct. 21, 1992 [JP]  Japan .................................. 4-283132
Oct. 21, 1992 [JP]  Japan .................................. 4-283134

[51] Int. Cl.$^5$ ................................ B32B 3/00
[52] U.S. Cl. ........................................ 428/64; 428/65; 428/457; 428/913; 430/945; 346/76 L; 346/135.1
[58] Field of Search ................... 428/64, 65, 457, 913; 430/945; 346/76 L, 135.1

[56] References Cited

U.S. PATENT DOCUMENTS 4,954,379  9/1990  Nishida ................................ 428/64
5,063,097  11/1991  Hirota ................................ 428/64

Primary Examiner—Patrick J. Ryan
Assistant Examiner—Elizabeth Evans
Attorney, Agent, or Firm—Nikaido Marmelstein Murray & Oram

[57] ABSTRACT

An optical recording medium including a recording layer of a tellurium alloy comprising at least a metal M, antimony Sb and germanium Ge added to tellurium and having the following composition formula:

$$M_z(Sb_xTe_{1-x})_{1-y-z}(Ge_{0.5}Te_{0.5})_y$$

$0.35 \leq x \leq 0.7$ $0.2 \leq y \leq 0.5$ $0.0001 \leq z < 0.05$ wherein the metal M is one kind of metal selected from the group consisting of niobium Nb and platinum Pt; and the subscripts x, y, 1-x and 1-y-z the numbers of atoms of elements (molar number of elements).

9 Claims, 1 Drawing Sheet

OPTICAL RECORDING MEDIUM

BACKGROUND OF THE INVENTION

This invention relates to an optical recording medium on which the recording and erasing of information can be done by irradiating the recording medium with light, and more particularly to a rewritable phase-change optical medium which permits information to be recorded thereon at a high speed, and which has a high record rewriting cyclability and a high long-term storage stability.

In a conventional rewritable phase-change optical medium, a recording layer consists of an alloy containing tellurium Te as a main component. In order to record information on this recording medium, a focused laser beam pulse is applied to the recording layer in a crystalline state for a short period of time to partially melt the same and form an amorphous recorded mark quenched and solidified by thermal diffusion. Since the reflectivity of this recorded mark is lower than that in the crystalline state, the former recorded mark becomes optically readable as a recorded signal. In order to erase the recorded mark, it is heated to a temperature not higher than the melting point thereof and not lower than the crystallization temperature thereof by irradiating the recorded mark with a laser beam, to crystallize the recorded mark in an amorphous state, whereby the recording layer can be returned to an unrecorded state.

The known tellurium alloys used for this recording layer include three-element alloys, such as $Ge_2Sb_2Te_5$ (N. Yamada et al, Proc. Int. Sym. on Optical Memory, 1987 p61–66). An optical recording medium having a recording layer of a tellurium alloy has the characteristics that it has a high crystallization speed and enables the overwriting of information to be done at a high speed with a circular single beam by only modulating the irradiation power of the light. An optical recording medium using such a tellurium alloy recording layer is usually provided with dielectric layers having thermal resistance and light transparency on both surfaces of the recording layer, and also a reflective layer of metal such as aluminum capable of reflecting light on the dielectric layer positioned on the side of the recording layer which is opposite to the optical beam entering side thereof. The dielectric layers are adapted to protect the recording layer so that the deformation and abrasion of the recording layer do not occur during a recording operation using an optical beam, and the reflective layer to improve the contrast of a reading signal during a reading operation by the optical interference of an incident optical beam and a reflected optical beam and carry out with ease the formation of a recorded mark in an amorphous state by the cooling effect.

In the above-described structure of an optical recording medium, and, especially, in a rapid cooling structure in which a recording layer and a dielectric layer between the recording layer and a reflective layer are formed to a small thickness of around 20 nm, the deterioration of the recording characteristics ascribed to the repetition of rewriting operations rarely occurs, though the deterioration of the same occurs much in a slow cooling structure in which dielectric layers are formed to a larger thickness of around 200 nm. The rapid cooling structure further has the characteristics that a margin of the erasing power is wider [T. Ohta et al, Japanese Journal of Applied Physics, Vol. 28 (1989) Suppl. 28-3 pp 123–128].

However, a rewritable phase-changeable optical recording medium of a rapid cooling structure has a problem that variation of the thickness of a recording layer and a very fine abrasion thereof are liable to occur when a recording, erasing or rewriting operation is repeated, i.e. a problem that the cyclability of this recording medium is low.

SUMMARY OF THE INVENTION

An object of the present invention is to provide an optical recording medium which solves the problems of the above-described conventional optical recording medium having a recording layer of a tellurium alloy, and which is superior in the recording cyclability and long term storage stability of recorded information.

Another object of the present invention is to provide an optical recording medium having excellent recording characteristics, i.e. a high recording sensitivity, a high carrier/noise ratio (C/N ratio), a high erasing speed and a high erasability.

The present invention capable of achieving these objects provides an optical recording medium comprising a substrate, a recording layer formed on the substrate and consisting of a tellurium alloy, dielectric layers, and a reflective layer, the tellurium alloy of the recording layer being phase-changed between a crystalline state and an amorphous state by being irradiated with light, whereby the recording and erasing of information can be done, the tellurium alloy of the recording layer comprising at least a metal M, antinomy Sb and germanium Ge added to tellurium Te and having the following composition formula, $$M_z(Sb_xTe_{1-x})_{1-y-z}(Ge_{0.5}Te_{0.5})_y \qquad (1)$$

$$0.35 \leq x \leq 0.7$$

$$0.2 \leq y \leq 0.5$$

$$0.0001 \leq z \leq 0.05$$

wherein the metal M is one kind of metal selected from the group consisting of niobium Nb and platinum Pt; and the subscripts x, y, 1-x and 1-y-z the numbers of atoms of elements (molar number of elements).

Adding some other metal component to the tellurium alloy constituting the recording layer in the present invention is not prohibited. For example, a tellurium alloy to which palladium is added as shown in the following composition formula can also be preferably used, $$M_zPd_p(Sb_xTe_{1-x})_{1-y-z}(Ge_{0.5}Te_{0.5})_y \qquad (2)$$

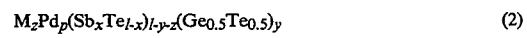

$$0.35 \leq x \leq 0.7$$

$$0.2 \leq y \leq 0.5$$

$$0.0001 \leq z \leq 0.01$$

$$0.0001 \leq p \leq 0.005$$

wherein the metal M is one kind of metal selected from the group consisting of niobium Nb and platinum Pt; and the subscripts x, y, 1-x, 1-y-z and p the numbers of atoms of elements (molar number of elements).

Both of the tellurium alloys consisting of the above-mentioned components are in a substantially single-phase crystalline state, so that the crystallization speeds of these alloys become high when they are irradiated with an optical beam. Moreover, even when the recording, erasing and rewriting operations are repeated many times, variation of the thickness of the recording layer and the abrasion thereof do not occur easily, and the thermal stability of a recorded mark can be improved.

DESCRIPTION OF THE PREFERRED EMBODIMENTS

Figure 1:
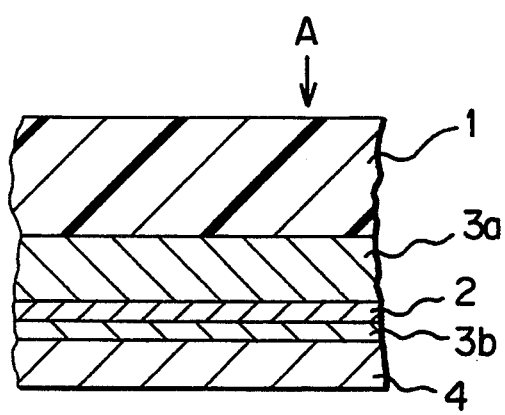
FIG. 1 is a schematic sectional view of an embodiment of the optical recording medium according to the present invention.

FIG. 1 shows a typical embodiment of the optical recording medium according to the present invention, which is formed by laminating a recording layer 2 on a substrate 1 via a first dielectric layer 3a, and a reflective layer 4 on the recording layer 2 via a second dielectric layer 3b. The light is applied to such an optical recording medium in the direction of an arrow A. This optical recording medium is used in various modes, i.e., in the shape of a disc, a card and a tape.

Figure 2:
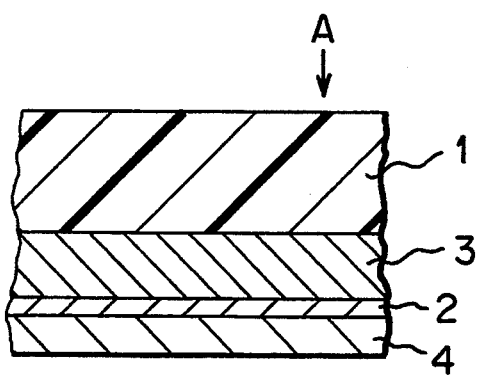
FIG. 2 is a schematic sectional view of another embodiment of the optical recording medium according to the present invention.

Although the embodiment of FIG. 1 has two dielectric layers sandwiching the recording layer 2, the optical recording medium may also be formed without any trouble so that the recording layer 2 and reflective layer 4 directly contact each other as shown in the mode of embodiment of FIG. 2 with the second dielectric layer 3b omitted. The reflective layer may be provided thereon with a protective layer of $SiO_2$, ZnS or ZnS-$SiO_2$, a layer of a resin, such as an ultraviolet-ray curing resin and a bonding agent layer for laminating the reflective layer on another substrate, with consideration given to the prevention of spoiling of the effect of the present invention.

According to the present invention, the material for the recording layer consists of a material of the above-mentioned composition formula (1) or (2), which is a chalcogen compound containing tellurium as a main component and capable of taking at least two states, i.e. a crystalline state and an amorphous state. The recording layer is a novel non-stoichiometric solid solution which is typically in a substantially single crystalline state when it is in a crystalline state, and which consists of at least four elements. Since this tellurium alloy is in a single phase when it is in a crystalline state, the crystallization speed thereof is very high, and the rewriting of recorded information can be done at a high speed. Since this alloy is in a substantially single phase when it is in a crystalline state, it has an advantage that the deterioration of the recording characteristics, which is ascribed to composition segregation, rarely occurs.

The niobium Nb and platinum Pt used as the metal M in the above-mentioned composition formula (1) or (2) in the range of content expressed by z in the formula minimize the occurrence of variation of thickness of a recording layer and the abrasion thereof which are ascribed to the frequent repetition of a recording, erasing or rewriting operation. Although the details of this phenomenon have not yet been made thoroughly clear, it is assumed that the Nb and Pt are combined firmly with the elements Te and Sb in the recording layer to increase the viscosity of the recording layer in a high-temperature molten state, so that the fluidity of the recording layer during a recording operation using an optical beam radiation lowers. The Nb and Pt have a large deterioration minimizing effect with respect to a large number of repetitions of recording operations as compared with other metals, such as Co, and also an effect in improving the thermal stability of the amorphous state of a recorded mark in the recording layer.

When the value of z in the composition formula is larger than 0.05, the recording layer in a crystalline state consists of crystals of substantially a plurality of phases. Consequently, the crystallization speed is very low, and segregation becomes liable to occur, so that it becomes difficult to carry out erasing and rewriting operations repeatedly. In view of this, it is more preferable to set the upper limit value of z to less than 0.01. However, when the value of z is tooo small, i.e. less than 0.0001, the significant effect already described is not produced, and the rewriting cyclability of the recording layer and the thermal stability of a recorded mark in an amorphous state lower greatly. The value of z is more preferably set to not less than 0.0005 and more than 0.005.

When the value of x is in the range of $0.35 \leq x \leq 0.7$, the crystallization speed is high, and a high-speed rewriting operation becomes possible, the reversibility of rewriting also becoming high. When x is larger than 0.7, the quantity of a Sb component becomes too large, and, when x is less than 0.35, the quantity of a Te component becomes too large. Therefore, in both of these cases, the crystallization speed becomes very low and segregation becomes liable to occur, so that the repeating of a rewriting operation becomes difficult. The value of x is more preferably set to not less than 0.4 and not more than 0.5.

When the value of y in the composition formula is in the range of $0.2 \leq y \leq 0.5$, the thermal stability of a recorded mark in an amorphous state and the crystallization speed thereof are high, so that the rewriting of recorded information can be done at a high speed. When this value is larger than 0.5, the repeat rewriting resistance of the recording layer becomes very low, though the thermal stability of a recorded mark in an amorphous state is high. When this value is less than 0.2, the thermal stability of a recorded mark in an amorphous state becomes extremely low. The value of y is more preferably set to not less than 0.3 and less than 0.4.

According to the present invention, it is preferable that the thickness of the recording layer mentioned above be set to a level in the range of 10–30 nm.

The dielectric layers in the present invention have a substrate- and recording layer-protecting effect whereby the thermal deformation of these parts during a recording operation and the deterioration of the recording characteristics of the recording layer are prevented, as well as an effect in improving owing to the optical interfering effect the contrast of a reading signal during a rewriting operation. The dielectric layers may consist of inorganic films composed of ZnS, $SiO_2$, silicon nitride and aluminum oxide. Especially, a film of ZnS, films of oxides of metals, such as Si, Ge, Al, Ti, Zr and Ta, films of nitrides of Si and Al, films of carbides of Ti, Zr and Hf and films of mixtures of compounds of these metals are preferable since they have a high thermal resistance. The materials obtained by mixing these metals with carbon or a fluoride, such as $MgF_2$ are also preferably used since films consisting of them have small residual strain. Especially, a film of a mixture of Zn and $SiO_2$ and a film of a mixture of ZnS, $SiO_2$ and carbon, in which even the repetition of recording and erasing operations rarely causes a decrease in the recording sensitivity, C/N ratio and erasing speed, are preferably used. Above all, a film of a mixture of ZnS, $SiO_2$ and carbon is preferable.

The thickness of the dielectric layer is usually about 10–500 nm. When first and second dielectric layers are provided, it is preferable to set the thickness of the first dielectric layer to 100–400 nm so that this layer is not easily separated from a substrate and a recording layer and cracked, and to set the thickness of the second dielectric layer to 10–30 nm for the purpose of enabling the recording characteristics, such as a C/N ratio and erasability of the optical recording medium to be improved, and a large number of rewriting operations to be carried out stably.

The materials for the reflective layer in the present invention include metals having optical reflectivity, such as Al and Au; an alloy containing these metals as main components and additional elements, such as Ti, Cr and Hf; a mixture of a metal, such as Al and Au and a metal compound, such as nitride of a metal, i.e. Al and Si, oxide of such metals and chalcogenide of such metals. Among these materials, metals, such as Al and Au and an alloy containing such metals as main components are specially preferable because they have a high optical reflectivity and because they are capable of increasing the thermal conductivity of the reflective layer. The alloys referred to above include an alloy obtained by adding a total of not more than 5 atom percent and not less than 1 atom percent of at least one kind of element out of Si, Mg, Cu, Pd, Ti, Cr, Hf, Ta, Nb and Mn to Al, and an alloy obtained by adding a total of not less than 1 atom percent and not more than 20 atom percent of at least one kind of element out of Cr, Ag, Cu, Pd, Pt and Ni to Au.

Especially, an alloy containing Al as a main component is practically useful because of the low price of the materials. An alloy obtained by adding a total of not less than 0.5 atom percent and not more than 5 atom percent of at least one kind of metal selected from Ti, Cr, Ta, Hf, Zr, Mn and Pd to Al is specially preferable since it has a high corrosion resistance.

Preferable Al alloys having a high corrosion resistance and capable of substantially preventing the occurrence of hillocks include alloys each of which contains a total of not less than 0.5 atom percent and less than 3 atom percent of an additional element, such as Al-Hf-Pd alloy, Al-Hf alloy, Al-Ti alloy, Al-Ti-Hf alloy, Al-Cr alloy, Al-Ta alloy, Al-Ti-Cr alloy and Al-Si-Mn alloy. Out of these Al alloys, the Al-Hf-Pd alloy having composition expressed by the following formula has specially high thermal stability with respect to a large number of times of repetition of recording and erasing operations, and is therefore capable of minimizing the deterioration of the recording characteristics of the recording layer.

$$Pd_j Hf_k Al_{l-j-k}$$

$$0.001 < j < 0.01$$

$$0.005 < k < 0.10$$

wherein the subscripts j, k and l-j-k represent ratios of the number of atoms (molar ratios) of the elements.

The thickness of the reflective layer consisting of any of these alloys is set generally to not less than 10 nm and not more than 200 nm, and preferably to 30–200 nm.

The materials which can be used for the substrate in the present invention include various kinds of known transparent synthetic resins and transparent glass. In order to prevent the substrate from being influenced by dust and flows, it is preferable to use a transparent substrate and carry out a recording operation from the side of a substrate with a focused optical beam. Such a transparent substrate material include glass, polycarbonate, polymethyl methacrylate, polyolefin resin, epoxy resin and polyimide resin.

Especially, polycarbonate resin and amorphous polyolefin resin are preferably used since they have small optical birefringence, a low hygroscopicity and a high moldability.

Although the thickness of the substrate is not specially limited, it is practical to set it to 0.01–5 mm. When this thickness is less than 0.01 mm, the substrate becomes liable to be influenced by dust even during a recording operation with a focused optical beam applied to the recording medium form the side of the substrate. When this thickness is larger than 5 mm, it becomes difficult to increase the numerical aperture of an objective lens and the spot size of the irradiation beam becomes large. Consequently, it becomes difficult to increase the recording density.

The substrate may be formed either flexibly or rigidly. A flexible substrate is used in the shape of a tape, a sheet and a card. A rigid substrate is used in the form of a card or a disc. These substrates may be formed to an air sandwich structure, an air incident structure or a solid structure by using two substrate members after a recording layer has been formed.

The light sources used for recording information on the optical recording medium according to the present invention include sources of high-intensity light, such as a laser beam and stroboscopic light. Especially, a semiconductor laser beam is preferable since it enables a light source structure and power consumption to be minimized and can be modulated easily.

A recording operation is carried out by irradiating a recording layer in a crystalline state with a laser beam pulse to form an amorphous recorded mark. Conversely, a crystalline recorded mark may be formed on an amorphous recording layer. The erasing of information can be done by crystallizing an amorphous recorded mark with a laser beam applied thereto, or making an amorphous crystalline recorded mark with a laser beam applied thereto. However, it is preferable to carry out a recording operation by forming an amorphous recorded mark, and an erasing operation by crystallizing an amorphous recorded mark since this method enables the recording speed to be increased and can substantially prevent the deformation of a recording layer. The intensity of light is set high during the formation of a recorded mark, and somewhat low during the erasing on the mark. It is preferable to employ a single beam overwrite method in which the rewriting of information is done with a one-time optical beam radiating operation, because this method enables the time required for carrying out the rewriting of informaiton to be reduced.

The above-described optical recording medium according to the present invention is preferably manufactured by the following method.

The methods of forming a reflective layer and a recording layer on a substrate include known methods of forming films in a vacuum, for example, vacuum evaporation, ion plating and sputtering. Especially, the sputtering is preferably employed since it enables the composition and thickness of films to be controlled easily.

The controlling to the thickness of a recording layer to be formed can be done easily by monitoring the condition of accumulation of film-forming materials by a quartz oscillator type film thickness gauge based on known techniques.

The formation of a recording layer may be carried out with the substrate left fixed or in a moving or rotating state. Turning a substrate on its own axis is preferable, and combining a method of turning a substrate on its own axis and a method of turning a substrate orbitally more preferable since a film the inner portion of which has a high homogeneity can be obtained.

It is possible to provide as necessary a dielectric layer of ZnS or $SiO_2$ or a protective layer of a resin, such as an ultraviolet ray-curing resin for the prevention of occurrence of flaws on and deformation of a reflective layer, after the formation of a reflective layer, after the formation of a reflective layer, in such a manner that the effect of the present invention is not greatly spoiled. Two substrate members may be pasted on the opposite sides of a laminate with a bonding agent after the formation of a reflective layer, or after the formation of the above-mentioned protective layer of a resin thereon.

A recording layer is preferably crystallized in advance by applying a laser beam or the light from a xenon flash lamp before the recording of information has been doen in practice.

As described above, the optical recording medium according to the present invention, in which a recording layer is formed out of a Te alloy referred to above, enables a recording operation to be carried out with a high sensitivity and at a high speed, and has so high a durability that recording and erasing operations can be carried out stably even such operations are repeated a large number of times, and a high long-term storage stability of a recorded mark.

The examples of the present invention and comparative examples will now be described, in which analyses and measurement were conducted by the following methods.

Analytical and measuring methods

The composition of a reflective layer and a recording layer was determined by the inductively coupled plasma atomic emission spectrometry (devised by the Seiko Denshi Kogyo Co., Ltd.). A carrier/noise ratio (C/N ratio) and an erasability (a difference between the intensity of a read carrier signal generated after the completion of a recording operation and that of a read carrier signal generated after the completion of an erasing operation) were determined by a spectrum analyzer.

The thickness of a film being formed of each of a recording layer, a dielectric layer and a reflective layer was monitored by a quartz oscillator type film thickness gauge. The thickness of each layer was measured by observing a cross section thereof through a scanning or transmission type electron microscope.

EXAMPLE 1

A recording layer, dielectirc layers and a reflective layers were formed by a RF-sputtering method as a polycarbonate substrate of 1.2 mm in thickness and 13 cm in diameter having 1.6 μm pitch spiral grooves was rotated at 30 revolutions per minute.

First, a vacuum chamber evacuated to $1 \times 10^{-5}$Pa, and ZnS to which 20 mol % of $SiO_2$ was added was then sputtered in an Ar gas atmosphere to form a first dielectric layer of 300 nm in thickness on a substrate. A compound target in which a Nb chip was placed on a three-element alloy consisting roughly of $Ge_{0.18}$, $Sb_{0.27}$, $Te_{0.55}$ was then sputtered to form a 23 nm thick recording lawyer of composition of $Nb_{0.004}$, $Ge_{0.18}$, $Sb_{0.267}$, $Te_{0.549}$. A second dielectric layer described above was then formed to a thickness of 20 nm, and an alloy of $Mn_{0.01}$, $Si_{0.04}$, $Al_{0.95}$ was sputtered to form a 100 nm thick reflective layer. The disc was taken out from the vacuum chamber and then the reflective layer was spin-coated with an ultraviolet ray-curing acrylic resin. This resin was cured with ultraviolet rays to form a 10 μm resin layer and obtain an optical recording medium according to the present invention.

This optical recording medium was irradiated with a semiconductor laser beam of a wavelength of 820 nm to crystallize and initialize the recording layer on the whole surface of the disc. An overwrite recording operation was carried out 100 times with a semiconductor laser beam modulated to a frequency of 3.7 MHz, a pulse width of 60 nsec, peak power of 9–17 mW and bottom power of 4–9 mW by using an optical head having numerical aperture of an objective lens of 0.5 and a wavelength of semiconductor laser of 780 nm, with the recording medium rotated at a linear velocity of 6 m/sec, and the recording medium was then irradiated with a semiconductor laser beam of reproducing power of 1.3 mW to measure a C/N ratio under the condition of a band width of 30 kHz.

This portion was irradiated with a semiconductor laser beam, which was modulated in the same manner as mentioned above, with 1.4 MHz to single-beam overwrite the same, and the erasability with respect to 3.7 MHz at this time was determined.

A practically sufficient C/N ratio of not less than 50 dB was obtained with peak power of not less than 15 mW, and a practically sufficient erasability of not less than 20 dB and a maximum erasing rate of 30 dB with bottom power of 6–9 mW.

A single-beam overwriting operation was the repeated 1000 and 100000 times under the conditions of peak power of 17 mW, bottom power of 8 mW and a frequency of 3.7 MHz, and similar measurement was thereafter conducted. The variations of C/N ratio and erasability were all within 2 dB, and the deterioration of the optical recording medium was not substantially observed.

EXAMPLE 2

Optical recording media identical with that in Example 1 except that the composition of the recording layers was changed to $Nb_{0.002}$, $Ge_{0.195}$, $Sb_{0.27}$, $Te_{0.533}$ and $Nb_{0.005}$, $Ge_{0.17}$, $Sb_{0.284}$, $Te_{0.541}$ were manufactured. These two optical recording media were subjected to the measurement of recording characteristics using the same apparatus as in Example 1. In both cases, a practically sufficient C/N ratio of not less than 50 dB was obtained with peak power of not less than 15 mW, and a practically sufficient erasability of not less than 20 dB and a maximum erasing rate of 30 dB with bottom power of 6–9 mW.

A single-beam overwriting operation was repeated 1000 and 100000 times under the conditions of peak power of 17 mW, bottom power of 8 mW and a frequency of 3.7 MHz, and the same measurement was conducted. The variations of C/N ratio and erasing rate were all within 2 dB, and the deterioration of the recording media was not substantially observed.

EXAMPLE 3

The same optical recording medium as in Example 1 was rotated at a linear velocity of 6 m/sec by using the same apparatus as in Example 1, and an overwrite recording operation was repeated 100 times with a semiconductor laser beam modulated to a frequency of 3.7 MHz, a pulse width of 50 nsec, peak power of 17 mW and bottom power of 8 mW. The optical recording medium was then irradiated with a semiconductor laser beam of reproduction power of 1.3 mW to determine the intensity of a reproduction signal and C/N ratio under the conditions of a band width of 30 kHz. The recording of information was done on other plural adjacent tracks under the same conditions, and the recording medium was then rotated at a linear velocity of 16 m/sec and irradiated with a semiconductor laser beam having reproduction power of 1.3 mW, whereby the intensity of a reproduction signal of a frequency of 9.87 MHz was measured under the condition of a band width of 30 kHz. This portion was irradiated with a semiconductor laser beam of constant power, and an initial erasing rate was determined.

The recording medium was then rotated at the same linear velocity of 16 m/sec, and an overwrite recording operation was carried out 100 times with a semiconductor laser beam modulated to the conditions of a frequency of 3.7 MHz, a pulse width of 50 nsec, peak power of 17 mW and bottom power of 8 mW. This optical recording medium was stored in an oven of 90° C. and taken out therefrom after the lapse of 300 hours and then cooled to room temperature. It was then rotated at the same linear velocity of 16 m/sec, and irradiated with a semiconductor laser beam of reproduction power of 1.3 mW, whereby the intensity of a reproduction signal of a frequency of 9.87 MHz was measured under the conditions of a band width of 30 kHz. This portion was irradiated with a semiconductor laser beam of constant power, and an erasability was measured after it has been heated. The optical recording medium was further rotated at a linear velocity of 6 msec, and a semiconductor laser beam of reproduction power of 1.3 mW was applied in the same manner to the signals which had been recorded before in the tracks, whereby the intensity of a reproduction signal and C/N ratio were measured under the conditions of a band width of 30 kHz. Information was further recorded on other adjacent unrecorded tracks under the same conditions, and then a semiconductor laser beam of reproduction power of 1.3 mW was applied to the recording medium in the same manner, whereby the intensity of a reproduction signal and C/N ratio were measured udner the conditions of a band width of 30 kHz. The initial erasability was not less than 25 dB with 9–11 mW, and, after the lapse of 300 hours, a practically sufficient erasability of not less than 22 dB was obtained with 10–12 mW. Accordingly, it can be estimated that the optical recording medium had long-term stability of sufficient erasing characteristics at room temperature.

The C/N ratio was initially 53 dB, and, after the lapse of 300 hours, it was 52 dB with respect to both a recording sign generated before a heating operation was carried out and a signal generated after the heating operation was carried out, i.e., the deterioration of the optical recording medium did not substantially occur.

COMPARATIVE EXAMPLE 1

An optical recording medium the construction of which was identical with that used in Example 1 except that the recording layer in the former consisted of $Ge_{0.18}$, $Sb_{0.26}$, $Te_{0.56}$ was manufactured, and measurement was conducted in the same manner as in Example 3.

The C/N ratio was initially 53 dB, and the C/N ratio of a signal recorded after the lapse of 300 hours and prior to a heating operation 35 dB, i.e., great deterioration of the optical recording medium was observed. This proved that the thermal stability of the recorded mark was insufficient, and that the longterm storage stability of recorded information had problems.

EXAMPLE 4

An optical recording medium identical with that used in Example 1, except that the substrate for the recording layer in the former was changed to a format-carrying substrate with the thickness of the reflective layer set to 120 nm was manufactured.

This optical recording medium was irradiated with a semiconductor laser beam having a wavelength of 820 nm to crystallize and initialize the recording layer on the whole surface of the disc. An overwrite recording operation was then carried out 100 times with a semiconductor laser beam modulated to a frequency of 6.9 MHz, a pulse width of 50 nsec, peak power of 12–24 mW and bottom power of 4–12 mW, by using an optical head having numerical aperture of an objective lens of 0.5 and a wavelength of semiconductor laser of 830 nm with the recording medium rotated at a linear velocity of 11.2 m/sec, and a C/N ratio was measured under the condition of a band width of 30 kHz. This portion was then irradiated with a semiconductor laser beam, which was modulated in the same manner as mentioned above, with 2.6 MHz to single-beam overwrite the same, and the erasability with respect to 6.9 MHz at this time was measured. A practically sufficient C/N ratio of not less than 50 dB was obtained with peak power of not less than 16 mW, and a practically sufficient erasability of not less than 20 dB with bottom power of 8–11 mW.

A 2-7 code (frequency at 1.5T of 6.9 MHz) random data pattern was recorded on an adjacent track 100 times with a semiconductor laser beam modulated to a pulse width of 50 nsec, peak power of 18 mW and bottom power of 8 mW, with the recording medium rotated at a linear velocity of 11.2 m/sec, and another 200000 times in an overwriting mode. The recorded information was then read, and the reproducing waveform was observed. An excellent reproducing waveform as compared with that obtained after the initial 100 times recording operations had been completed was obtained, i.e., the deterioration of the recording medium was not substantially observed. The bit error rate (BER) of this track was measured to find out that it was as low as $2 \times 10^{-4}$.

The collapse of the reproduction waveform corresponding to front and rear end portions of the recording sector due to the movement of the recording material was not substantially observed, and the disorder of the reproducing waveform corresponding to an intermediate data portion not substantially observed either.

COMPARATIVE EXAMPLE 2

A conventional optical recording medium which was out of the scope of the present invention, and which had the same construction as the optical recording medium in Example 4 except that the recording layer in the former consisted of $Ge_{0.22}$, $Sb_{0.23}$, $Te_{0.55}$ was manufactured. The recording sensitivity of this optical recording medium was measured and found out that it was substantially equal to that of Example 1. This optical recording medium was subjected to overwrite recording operations in the same manner as in Example 1 100 times initially and 100000 times thereafter to observe a reproducing waveform. In the optical recording medium after subjected to 100000 times of overwrite recording operations, the thickness of the recording layer varied greatly, and the signal corresponding to the data portion had many amplitude decreased portions, though such phenomena were less distinct in the same optical recording medium after subjected to only 100 times of overwrite recording operations. The bit error rate (BER) determined was not less than $3 \times 10^{-1}$ at which it is utterly difficult to read the data even if the errors were corrected.

The collapse of the reproducing waveform corresponding to front and rear end portions of the recording sector due to the movement of the recording material was clearly observed.

EXAMPLE 5

A recording layer, dielectric layers and a reflective layers were formed by RF-sputtering method as a polycarbonate substrate of 1.2 mm in thickness and 13 cm in diameter having 1.6 μm pitch spiral grooves was rotated at 30 revolutions per minute.

First, a vacuum chamber evacuated to $1 \times 10^{-5}$Pa, and ZnS to which 20 mol % of $SiO_2$ was added was then sputtered in an Ar gas atmosphere to form a first dielectric layer of 300 nm in thickness on a substrate. A compound target in which Pt chip was placed on a three-element alloy consisting roughly of $Ge_{0.18}$, $Sb_{0.26}$, $Te_{0.56}$ was then sputtered to form a 25 nm thick recording layer of composition of $Pt_{0.002}$, $Ge_{0.178}$, $Sb_{0.26}$, $Te_{0.56}$. A second dielectric layer consisting of ZnS just as the above-mentioned first dielectric layer was formed to a thickness of 20 nm, and an alloy of $Mn_{0.01}$, $Si_{0.04}$, $Al_{0.95}$ was sputtered on this second dielectric layer to form a 100 nm thick reflective layer. The disc was taken out from the vacuum chamber and then the reflective layer was spin-coated with an ultraviolet ray-curing acrylic resin. This resin was cured with ultraviolet rays to form a 10 μm resin layer and obtain an optical recording medium according to the present invention.

This optical recording medium was irradiated with a semiconductor laser beam of a wavelength of 820 nm in the same manner as in Example 1 to crystallize and initialize the recording layer on the whole surface of the disc. An overwrite recording operation was carried out 100 times with a semiconductor laser beam modulated to a frequency of 3.7 MHz, a pulse width of 60 nsec, peak power of 9–17 mW and bottom power of 4–9 mW by using an optical head having numerical aperture of an objective lens of 0.5 and a wavelength of semiconductor laser of 780 nm, with the recording medium rotated at a linear velocity of 6 m/sec, and the recording medium was then irradiated with a semiconductor laser beam of reproducing power of 1.3 mW to determine a C/N ratio under the condition of a band width of 30 kHz.

This portion was irradiated with a semiconductor laser beam, which was modulated in the same manner as mentioned above, with 1.4 MHz to single-beam overwrite the same, and the erasability with respect to 3.7 MHz at this time was determined.

A practically sufficient C/N ratio of not less than 50 dB was obtained with peak power of not less than 15 mW, and a practically sufficient erasability of not less then 20 dB and a maximum erasability of 30 dB with bottom power of 5–8 mW.

A single-beam overwriting operation was repeated 1000 and 200000 times under the conditions of peak power of 17 mW, bottom power of 8 mW and a frequency of 3.7 MHz, and similar measurement was thereafter conducted. The variations of C/N ratio and erasability were all within 2 dB, and the deterioration of the optical recording medium was not substantially observed.

This optical recording medium was placed for 100000 hours in an atmosphere having a temperature of 80° C. and a relative humidity of 80%, and a recorded portion was then read to find out that the C/N ratio varied by less than 2 dB, i.e., did not substantially vary. The recording medium was subjected to recording and erasing operations again, and a C/N ratio and an erasability were measured to find out that substantially no variation was observed just as those measured initially.

COMPARATIVE EXAMPLE 3

An optical recording medium the construction of which was identical with that of the optical recording medium in Example 5 except that the recording layer of the former consisted of $Ge_{0.18}$, $Sb_{0.26}$, $Te_{0.56}$ was manufactured, and measurement was conducted in the same manner as in Example 5.

The C/N ratio was 53 dB initially, 52 dB after the lapse of 150 hours, and 40 dB after the lapse of 1000 hours, i.e., the great deterioration of the recording medium was observed after the lapse of 1000 hours. This proved that the thermal stability of the recorded mark was insufficient, and that the long-term storage stability of recorded information had problems.

EXAMPLE 6

Optical recording media the construction of which was identical with that of the optical recording medium in Example 5 except that the composition of the recording layers of the former consisted of $Pt_{0.001}$, $Ge_{0.179}$, $Sb_{0.26}$, $Te_{0.56}$; and $Pt_{0.005}$, $Ge_{0.177}$, $Sb_{0.26}$, $Te_{0.558}$ were manufactured. These two optical recording media were subjected to the measurement of recording characteristics using the apparatus identical with that used in Example 1. In both of these recording media, a practically sufficient C/N ratio of not less than 50 dB was obtained with peak power of not less than 15 mW, and a practically sufficient erasability of not less than 20 dB and a maximum erasability of 30 dB with bottom power of 5–8 mW.

A single-beam overwriting operation was repeated 1000 and 200000 times under the conditions of peak power of 17 mW, bottom power of 8 mW and a frequency of 3.7 MHz, and similar measurement was thereafter conducted. The variations of C/N and erasability were all within 2 dB, and the deterioration of the optical recording media was not substantially observed.

EXAMPLE 7

An optical recording medium the construction of which was identical with that in Example 5 except that the recording layer of the former consisted of $Pt_{0.001}$, $Ge_{0.179}$, $Sb_{0.26}$, $Te_{0.56}$ with the thickness of a first dielectric layer set to 200 nm was manufactured. This optical recording medium was subjected to the measurement of recording characteristics with an apparatus identical with that used in Example 1, by a method identical with that used in Example 1 except that the linear velocity, recording frequency, overwriting frequency used during the measurement of an erasability, and recording pulse width were set to 15 m/sec, 7.35 MHz, 2.76 MHz and 50 nsec respectively. A practically sufficient C/N ratio of not less than 50 dB was obtained with peak power of not less than 15 mW, and a practically sufficient erasability of not less than 20 dB and a maximum erasability of 27 dB with bottom power of 7-10 mW.

EXAMPLE 8

An optical recording laser identical with that in Example 5 except that a substrate was changed to some other format-carrying substrate with the thickness of a reflective layer set to 120 nm was manufactured.

A 2-7 code (frequency at 1.5T of 5.3 MHz) random data pattern was recorded in an overwriting mode on the same track 100 times and another 100000 times with a semiconductor laser beam modulated to a pulse width of 50 nsec, peak power of 20 mW and bottom power of 9 mW, by using an optical head having numerical aperture of an objective lens of 0.5 and a wavelength of semiconductor laser of 830 nm with the recording medium rotated at a linear velocity of 8.5 m/sec. The recorded information was then read and the reproducing waveform was observed. An excellent waveform having substantially no deteriorated parts as compared with the waveform obtained after the completion of the initial 100 times of recording operations was obtained. The bit error rate (BER) measured of this track was as low as $3 \times 10^{-5}$.

The collapse of the reproducing waveform corresponding to front and rear end portions of the recording sector due to the movement of the recording material was not substantially observed, and the disorder of the reproducing waveform corresponding to an intermediate data portion not substantially observed either.

COMPARATIVE EXAMPLE 4

A conventional optical recording medium which was out of the scope of the present invention, and which had the same construction as the optical recording medium in Example 8 except that the recording layer in the former consisted of $Ge_{0.22}$, $Sb_{0.23}$, $Te_{0.55}$ was manufactured. The recording sensitivity of this optical recording medium was measured and found out that it was substantially equal to that of Example 5. This optical recording medium was subjected to overwrite recording operations in the same manner as in Example 5 100 times initially and 100000 times thereafter to observe a reproducing waveform. In the optical recording medium after subjected to 100000 times of overwrite recording operations, the thickness of the recording layer varied greatly, and the reproducing signal corresponding to the data portion had many amplitude decreased portions, though such phenomena were less distinct in the same optical recording medium after subjected to 100 times of overwrite recording operaitons. The bit error rati (BER) measured was not less than $3 \times 10^{-1}$ at which it is utterly difficult to read the data even if the errors were corrected.

The collapse of the reproducing signal waveform corresponding to front and rear end portions of the recording sector due to the movement of the recording material was clearly observed.

EXAMPLE 9

An optical recording medium the construction of which was identical with that of the optical recording medium in Example 1 except that the recording layer in the former consisted of $Nb_{0.004}$, $Pd_{0.001}$, $Ge_{0.178}$, $Sb_{0.26}$, $Te_{0.557}$ in which a part of the niobium in the recording medium of Example 1 was replaced by palladium Pd with the reflective layer consisting of an aluminum alloy of $Pd_{0.002}$, $Hf_{0.02}$, $Al_{0.978}$ was manufactured.

This optical recording medium was initialized in the same manner as in Example 1. An overwrite recording operation was then carried out 100 times with a semiconductor laser beam modulated to a frequency of 3.7 MHz, a pulse width of 60 nsec, peak power of 9-17 mW and bottom power of 4-9 mW, by using the same optical head as that used in Example 1, and the optical recording medium was then irradiated with a semiconductor laser beam having reproducing power of 1.3 mW to measure the C/N ratio with a band width of 30 kHz.

This portion was then irradiated with a semiconductor laser beam, which was modulated in the same manner as mentioned above, with 1.4 MHz to single-beam overwrite the same, and the erasability with respect to 3.7 MHz at this time was measured.

A practically sufficient C/N ratio of not less than 50 dB was obtained with peak power of not less than 15 mW, and a practically sufficient erasability of not less than 20 dB and a maximum erasability of 30 dB with bottom power of 5-8 mW.

A single-beam overwriting operation was repeated 1000 and 200000 times under the conditions of peak power of 17 mW, bottom power of 8 mW and a frequency of 3.7 MHz, and similar measurement was thereafter conducted. The variations of C/N and erasability were all within 2 dB, and the deterioration of the optical recording medium was not substantially observed.

This optical recording medium was placed for 2000 hours in an atmosphere having a temperature of 80° C. and a relative humidity of 80%, and a recorded portion was then read to find out that the C/N ratio varied by less than 2 dB, i.e., did not substantially vary. The recording medium was subjected to recording and erasing operations again, and a C/N ratio and an erasability were measured to find out that substantially no variation was observed just as those determined initially.

EXAMPLE 10

An optical recording medium identical with that used in Example 1 was manufactured by the same sputtering method as was used in Example 1 except that a first dielectric layer, a recording layer, a second dielectric layer and a reflective layer were formed out of the same materials as in Example 1 and to thicknesses of 300 nm, 50 nm, 200 nm and 100 nm respectively on a 1.2 mm thick substrate of an acrylic resin.

This optical recording medium was subjected to repeated recording and erasing operations with the recording medium kept in a stationary state, by using an optical head on which a semiconductor laser having a wavelength of 830 nm and an objective lens having numerical aperture of 0.5 were mounted. The recording operation was carried out by applying an optical pulse of 17 mW and 80 nsec to the recording medium, and the erasing operation by applying an optical pulse of 7 mW and 80 nsec thereto. The reproducing light of 0.5 mW was applied to the recording medium during the recording operation and erasing operation to monitor the variation of reflectivity. Even after the recording and erasing operations were repeated 1000000 times under the same conditions, reversible variation of reflectivity was observed, and substantially no deterioration of the recording medium was observed.

EXAMPLE 11

An optical recording medium identical with that of Example 10 except that the recording layer of the former consisted of $Pt_{0.3}$, $Ge_{17.7}$, $Sb_{26}$, $Te_{56}$ was manufactured, and the same recording and erasing operations were carried out repeatedly. In this case, 1000000 times of stable recording and erasing operations could be carried out.

COMPARATIVE EXAMPLE 5

Optical recording media the construction of which was identical with that of the recording medium of Example 1 except that the recording layers of the former consisted of $Nb_{0.10}$, $Ge_{0.16}$, $Sb_{0.24}$, $Te_{0.50}$; and $Pt_{0.10}$, $Ge_{0.16}$, $Sb_{0.24}$, $Te_{0.50}$ were manufactured.

A recording operation was carried out in the same manner as in Example 1 but a recorded mark was not substantially erased at the time of starting an initial rewriting operation. The rewriting of recorded information was repeated 100 times. The reproducing signal was thereafter observed to find out that the recording of information could not have been done normally at all.

EXAMPLE 12

Recording films consisting of $Pt_{0.003}$, $Ge_{0.177}$, $Sb_{0.26}$, $Te_{0.56}$; and $Nb_{0.003}$, $Ge_{0.177}$, $Sb_{0.26}$, $Te_{0.56}$ were formed to a thickness of 50 nm on glass substrates by using the sputtering apparatus used in Example 1, and the crystallization temperature of the films in an amorphous state was measured on the basis of the variation of the electrical resistance and light transmittance. The results of the measurement conducted under the condition of a temperature increasing rate of 10° C./min showed that the crystallization temperature in both cases was 160° C., and it was proved that the amorphous state (corresponding to a recording state) was sufficiently stable at room temperature.

What is claimed is:

1. An optical recording medium comprising a substrate, a recording layer formed on said substrate and consisting of a tellurium alloy, at least one dielectric layer, and a reflective layer, the tellurium alloy of said recording layer being phase-changed between a crystalline state and an amorphous state by being irradiated with light, whereby the recording and erasing of information can be done, the tellurium alloy of said recording layer comprising at least a metal M, antimony Sb and germanium Ge added to tellurium Te and having the following composition formula, $$M_z(Sb_xTe_{1-x})_{1-y-z}(Ge_{0.5}Te_{0.5})_y$$

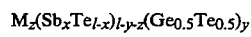

$$0.35 \leq x \leq 0.7$$

$$0.2 \leq y \leq 0.5$$

$$0.0001 \leq z \leq 0.05$$

wherein the metal M is one kind of metal selected from the group consisting of niobium Nb and platinum Pt; and the subscripts x, y, 1-x and 1-y-z the numbers of atoms of elements (molar number of elements).

2. An optical recording medium according to claim 1, wherein said z satisfies the relation, $0.0001 \leq z < 0.01$.

3. An optical recording medium according to claim 2, wherein said metal M is niobium Nb; and said y satisfies the relation, $0.2 \leq y \leq 0.4$.

4. An optical recording medium according to claim 1, wherein said dielectric layers consist of two layers, i.e. first and second dielectric layers, said substrate, said first dielectric layer, said recording layer, said second dielectric layer and said reflective layer being laminated in the mentioned order.

5. An optical recording medium according to claim 4, wherein the thicknesses of said first dielectric layer, said recording layer, said second dielectric layer and said reflective layer are 100–400 nm, 10–30 nm, 10–30 nm and 10–200 nm respectively.

6. An optical recording medium comprising a substrate, a recording layer formed on said substrate and consisting of a tellurium alloy, at least one dielectric layer, and a reflective layer, the tellurium alloy of said recording layer being phase-changed between crystalline state and an amorphous state by being irradiated with light, whereby the recording and erasing of information can be done, the tellurium alloy of said recording layer comprising at least a metal M, palladium Pd, antimony Sb and germanium Ge added to tellurium Te and having the following composition formula, $$M_zPd_p(Sb_xTe_{1-x})_{1-y-z}(Ge_{0.5}Te_{0.5})_y$$

$$0.35 \leq x \leq 0.7$$

$$0.2 \leq y \leq 0.5$$

$$0.0001 \leq z \leq 0.01$$

$$0.0001 \leq p \leq 0.005$$

wherein the metal M is one kind of metal selected from the group consisting of niobium Nb and platinum Pt; and the subscripts x, y, 1-x, 1-y-z and p the numbers of atoms of elements (molar number of elements).

7. An optical recording medium according to claim 4, wherein said metal M is niobium Nb; and said y satisfies the relation $0.2 \leq y < 0.4$.

8. An optical recording medium according to claim 4, wherein said dielectric layers consist of two layers, i.e. first and second dielectric layers, said substrate, said first dielectric layer, said recording layer, said second dielectric layer and said reflective layer being laminated in the mentioned order.

9. An optical recording medium according to claim 8, wherein the thicknesses of said first dielectric layer, said recording layer, said second dielectric layer and said reflective layer are 100–400 nm, 10–30 nm, 10–30 nm, and 10–200 nm respectively.

* * * * *